United States Patent [19]

Kaku et al.

[11] Patent Number: 5,598,433
[45] Date of Patent: Jan. 28, 1997

[54] AUTOMATIC EQUALIZER AND DATA MODE CONVERGENCE METHOD

[75] Inventors: Takashi Kaku; Kyoko Hirao, both of Kawasaki, Japan

[73] Assignee: Fujitsu Limited, Kawasaki, Japan

[21] Appl. No.: 441,014

[22] Filed: May 15, 1995

Related U.S. Application Data

[63] Continuation of Ser. No. 11,700, Feb. 1, 1993, abandoned.

[30] Foreign Application Priority Data

Jan. 31, 1992 [JP] Japan .................................. 4-016185

[51] Int. Cl.⁶ ...................................... H04B 3/04
[52] U.S. Cl. .................... 375/230; 375/232; 364/724.2
[58] Field of Search ................................. 375/229, 230, 375/232; 364/724.19, 724.2; 331/15

[56] References Cited

U.S. PATENT DOCUMENTS

| | | | |
|---|---|---|---|
| 4,615,038 | 9/1986 | Lim et al. | 375/12 |
| 5,077,755 | 12/1991 | Kaku et al. | 375/14 |
| 5,097,482 | 3/1992 | Serizawa et al. | 375/12 |

FOREIGN PATENT DOCUMENTS

| | | | |
|---|---|---|---|
| 0111135 | 7/1982 | Japan | 375/12 |
| 57-162821 | 10/1982 | Japan . | |
| 58-156207 | 9/1983 | Japan . | |
| 59-002447 | 4/1984 | Japan . | |
| 61-007735 | 1/1986 | Japan . | |
| 60-210032 | 3/1986 | Japan . | |
| 0092524 | 4/1987 | Japan | 375/12 |
| 2216353 | 12/1988 | United Kingdom . | |

OTHER PUBLICATIONS

*Fujitsu Scientific and Technical Journal,* Digital Signal Processor by Toshitakea Tsuda et al., vol. 25, No. 3, 1989, pp. 171–192.

European Search Report dated Dec. 2, 1993.

*Primary Examiner*—Stephen Chin
*Assistant Examiner*—T. Ghebretinsae
*Attorney, Agent, or Firm*—Staas & Halsey

[57] ABSTRACT

An automatic equalizer which converges by a received signal and a data mode convergence method. A variance extracting unit extracts the variance of an output signal of a transversal automatic equalizing section and changes a predecision input signal to a proper level according to the extracted variance. A decision unit makes a decision for the predecision input signal which has been changed by the variance extracting unit and allocates the predecision input signal to a signal point. An amplitude error extracting unit extracts an amplitude error from a predecision input signal and a postdecision output signal of the decision unit and corrects the tap coefficients of the transversal automatic equalizing section according to the extracted amplitude error.

18 Claims, 10 Drawing Sheets

AGC INPUT   LARGE

AGC TAP    SMALL

Fig. 10A

SMALL

LARGE

AUTOMATIC EQUALIZER AND DATA MODE CONVERGENCE METHOD

This application is a continuation, of application No. 08/011,700, filed Feb. 1, 1993, now abandoned.

BACKGROUND OF THE INVENTION

1. Field of the Invention

The present invention relates to an automatic equalizer converges in response to a received signal and a data mode convergence method.

2. Description of the Related Art

Modems (modulator/demodulator devices) have been used widely for data transmission over voice-grade analog lines. Modems are provided with automatic equalizers, for example, which correct that distortion of the received signal caused by an analog transmission line and establish synchronization of the received data.

Currently, when a terminal transmits data to another terminal using an analog voice line, the terminal on the receiving side performs a preset of an automatic equalizer of the modem of the local apparatus, a reproduction of a timing and a gain control of a gain control circuit based on the training signal. This enables the automatic equalizer to converge so that the distortion of the data is corrected and data can be demodulated.

In a data transmission system in which a center apparatus and a plurality of terminals are connected to a single transmission line in parallel, called a multi point system, it is necessary to enable the automatic equalizer to converge by making the center apparatus transmit a training signal every time the terminal diverges, when the automatic equalizer of the modem on the terminal loses its equalizing capability, and the automatic equalizer attempts to converge in accordance with the above method at the time of the divergence of the equalizer of the modem on the terminal. Thus, the above method, of enabling the diverged automatic equalizer to converge, decreases the efficiency of the data processing operation in the whole system.

Therefore, the data mode convergence method for enabling the automatic equalizer to converge with respective terminals receiving data has been proposed and some examples are shown in Japanese Patent early disclosure number 56-78243 and Japanese Patent Application No. 1-36284.

The conventional data mode convergence method is explained by referring to FIGS. 1 to 4. In the multi-point system, modems 11 to 13 of a plurality of terminals (slave station) 16 are connected to the modem 10 on the master station, such as center 15 in parallel through an analog voice line. In this system, the master station modem 10 operate at all times and the slave station modems 11 to 13 have their power sources turned on only when necessary, thereby transmitting the data.

The transmission side modulates data received through data transmission utilizing the analog line, it divides the data to be transmitted into groups of predetermined numbers of bits, (for example, three bits in FIG. 2A) and assigns the divided data to n, (for example, eight in FIG. 2A) signal points on a two dimensional plane. The receiving side demodulates the received data by judging which signal point, chosen out of the n signal points, the received signal corresponds to, based on the coordinate data (which are called as receiving on the two dimensional plane). The point in the coordinate data is called the receiving point.

Figure 1:
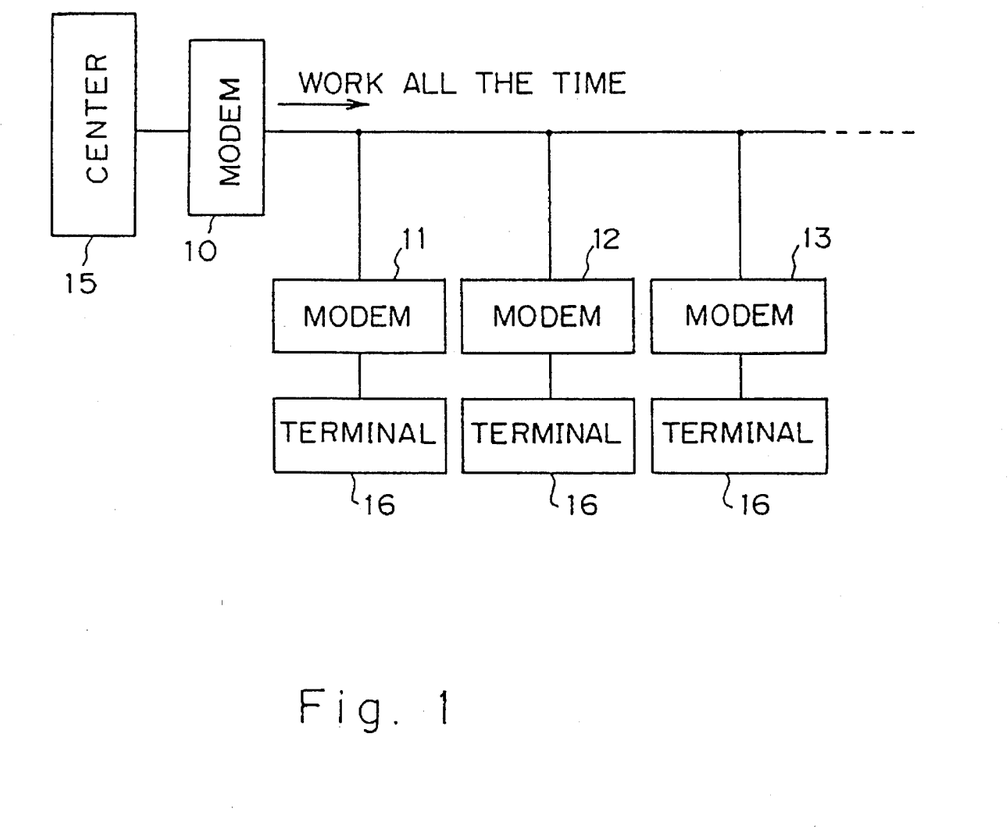
FIG. 1 illustrates an arrangement of a multi-point system.
Figure 2A:
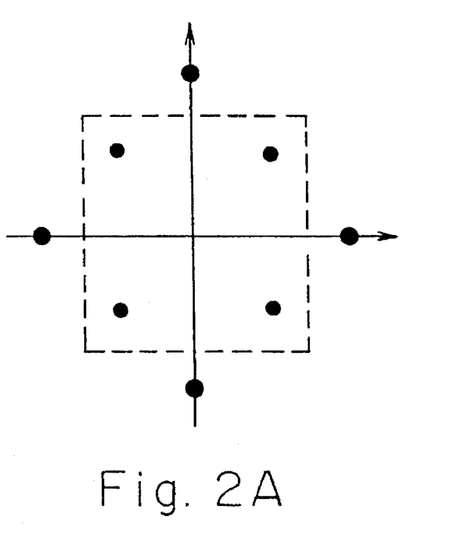
FIG. 2A is a first diagram for use in explanation of an eye pattern.
Figure 3:
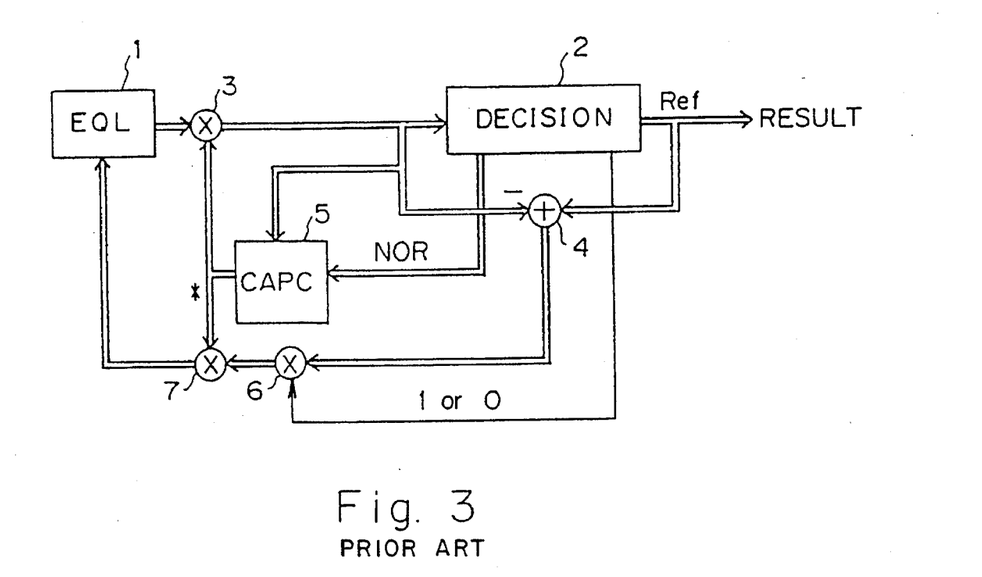
FIG. 3 illustrates an arrangement of a conventional automatic equalizer.

FIG. 3 is a schematic diagram of a conventional automatic equalizer. In the automatic equalizer the decision section 2 determines the target signal point based on the output of the automatic equalizer (EQL) 1. Specifically the coordinate data on the two dimensional plane of the received signal, whose gain is controlled by an AGC controller (described later) in the automatic equalizer 1. An arithmetic unit calculates the difference between the predecision input and postdecision output, thereby obtaining error data. Multiplier 6 multiplies the error data by the signal designating whether the determined signal point is outside the region surrounded by a dotted line in FIG. 2A or inside the region surrounded by the dotted line, (Specifically, "1" if it is outside the region and "0" if it is inside the region.)

If the signal point is located outside the dotted line shown in FIG. 2A, multiplier 6 multiplies error data by "1". When the signal point is located inside the dotted line, the multiplier 6 multiplies the data error data by "0". This is because the signal point inside the dotted line in FIG. 2A has a high possibility of being mistaken since the distances between signal points are short and the amount of interference between the data is large. Thus, the tap coefficients of automatic equalizer 1 are corrected by using error data of the signal points outside the dotted line which have a lower possibility of being mistaken.

Normalized data NOR from the decision section 2 and the predecision output are applied to a carrier automatic phase correcting section (CAPC) 5 where a phase correcting quantity is calculated. The output of the automatic equalizing section is multiplied by the phase correcting quantity by a multiplier 3, thereby performing phase correction. At the same time, the phase correcting quantity and the output of the multiplier 6 are multiplied by a multiplier 7 and the result is output to the automatic equalizing section 1 as a tap correcting quantity.

To enable the automatic equalizer to converge, it is necessary to first adjust the output level of automatic equalizer 1 to the optimum value and then to correct the phase of the output of automatic equalizer 1.

Figure 4:
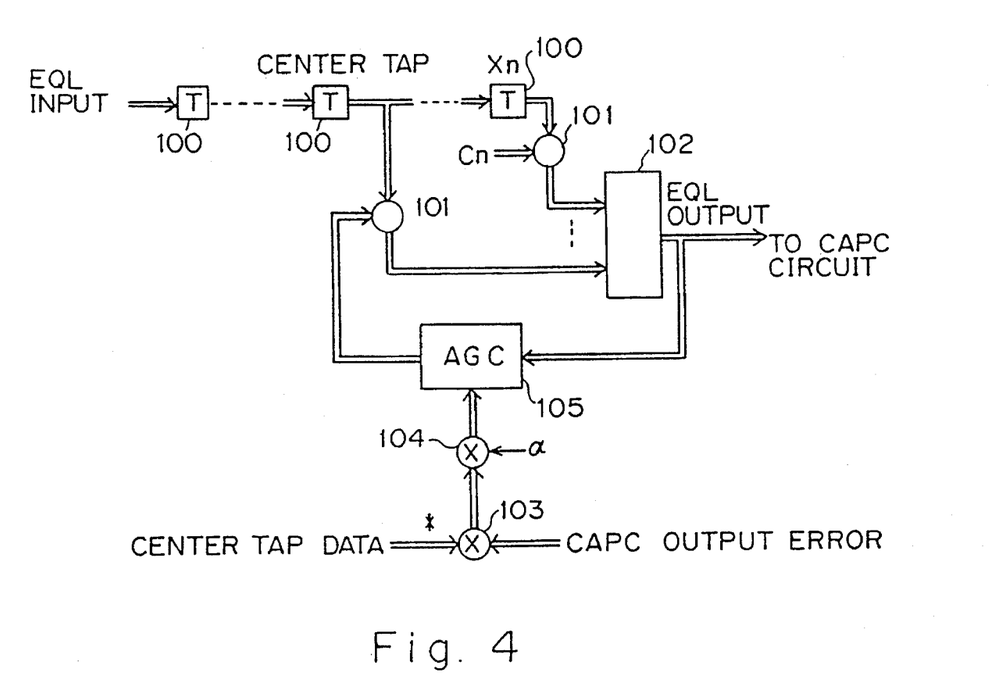
FIG. 4 illustrates an arrangement of the automatic equalizing section of FIG. 3.

FIG. 4 shows an example of an arrangement of the automatic equalizing section 1. The error output of the multiplier 7 (CAPC error) and center tap data are multiplied by a multiplier 103, and the result is then multiplied by a given control coefficient $\alpha$ in a multiplier 104. The result of multiplication is output to an AGC 105 as a reference voltage. The AGC 105 controls the level of an equalized output of an adder 102 according to the reference voltage, outputting the resulting tap coefficient to a multiplier 101.

In this way, the automatic equalizer is made convergent while the respective terminals are receiving the data.

However, the conventional data mode convergence method has the following drawbacks.

(1) The algorithm used in the conventional technique has not been established. In order to accommodate various types of lines, it is necessary to determine the control coefficient $\alpha$ shown in FIG. 4 on the basis of experimental results. However, it is difficult to determine the optimum value by experiment because signal points are made multi-valued, and the level adjustment for convergence is difficult.

Figure 2B:
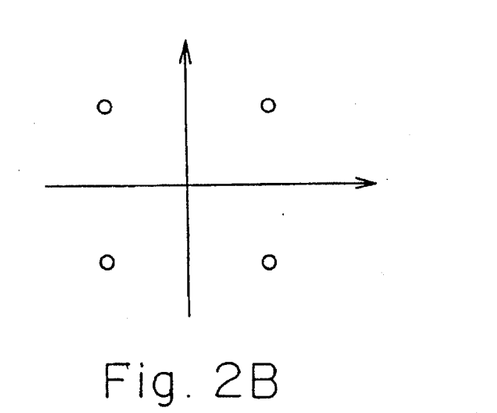
FIG. 2B is a second diagram for use in explanation of an eye pattern.
Figure 2C:
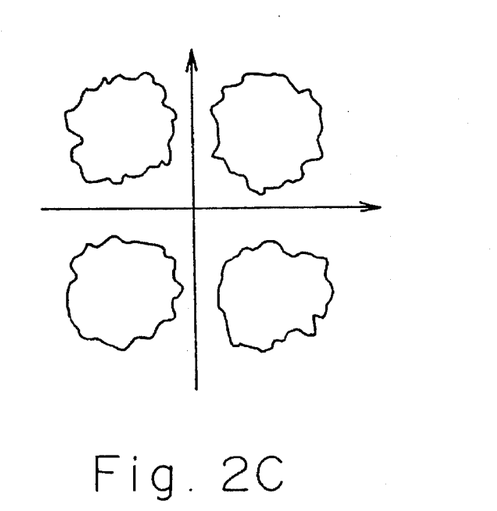
FIG. 2C is a third diagram for use in explanation of an eye pattern.

(2) In the prior art, it takes time for the automatic equalizer to change from a state in which it does not completely converge, or, more specifically, a state in which the receiving points are spread out and distributed around the signal points as shown in FIG. 2C, to a state in which the automatic equalizer reaches convergence as shown in FIG. 2B when the output level of automatic equalizer 1 is controlled to be constant.

(3) Both the phase error and amplitude error are fed back, and thus, requiring additional time to enable the automatic equalizer to converge.

SUMMARY OF THE INVENTION

An object of the present invention is to provide an automatic equalizer and a data mode convergence method which can adjust the level of a predecision input and permit convergence in a short time without depending on experiments.

Another object of the present invention is to provide an automatic equalizer and a data mode convergence method which extract only amplitude errors, thereby providing for speedy convergence.

A feature of the present invention resides in an automatic equalizer which makes a decision for an output signal of a transversal automatic equalizing section by a first decision section to obtain received data and corrects tap coefficients of the automatic equalizing section on the basis of an error signal obtained from a predecision input signal and a postdecision output signal, characterized by provision of a variance extracting section for extracting the variance of the output signal of the automatic equalizing section and changing the predecision input signal to a proper level, according to the extracted variance.

According to the present invention, there is provided an automatic equalizer which decides an output signal of a transversal automatic equalizing section by a first decision section to obtain received data and corrects tap coefficients of the automatic equalizing section based on an error signal obtained from a predecision input signal and a postdecision output signal, characterized by provision of a variance extracting section for extracting the variance of the output signal of the automatic equalizing section and changing the predecision input signal to a proper level according to the extracted variance.

For example, when a signal point decision is made after the output signal of the transversal automatic equalizing section has been controlled to have a constant level, the variance of the signal point decided on becomes large at convergence time and small at divergence time. Therefore, since the predecision input signal can be changed to a proper level according to the variance, it is possible to prevent the predecision input signal from deviating greatly from the optimum level allowing the convergence to be sped up.

BRIEF DESCRIPTION OF THE DRAWINGS

One skilled in the art can easily understand additional features and objects of this invention from the description of the preferred embodiments and some of the attached drawings. In the drawings.

DETAILED DESCRIPTION OF THE PREFERRED EMBODIMENT

Figure 5:
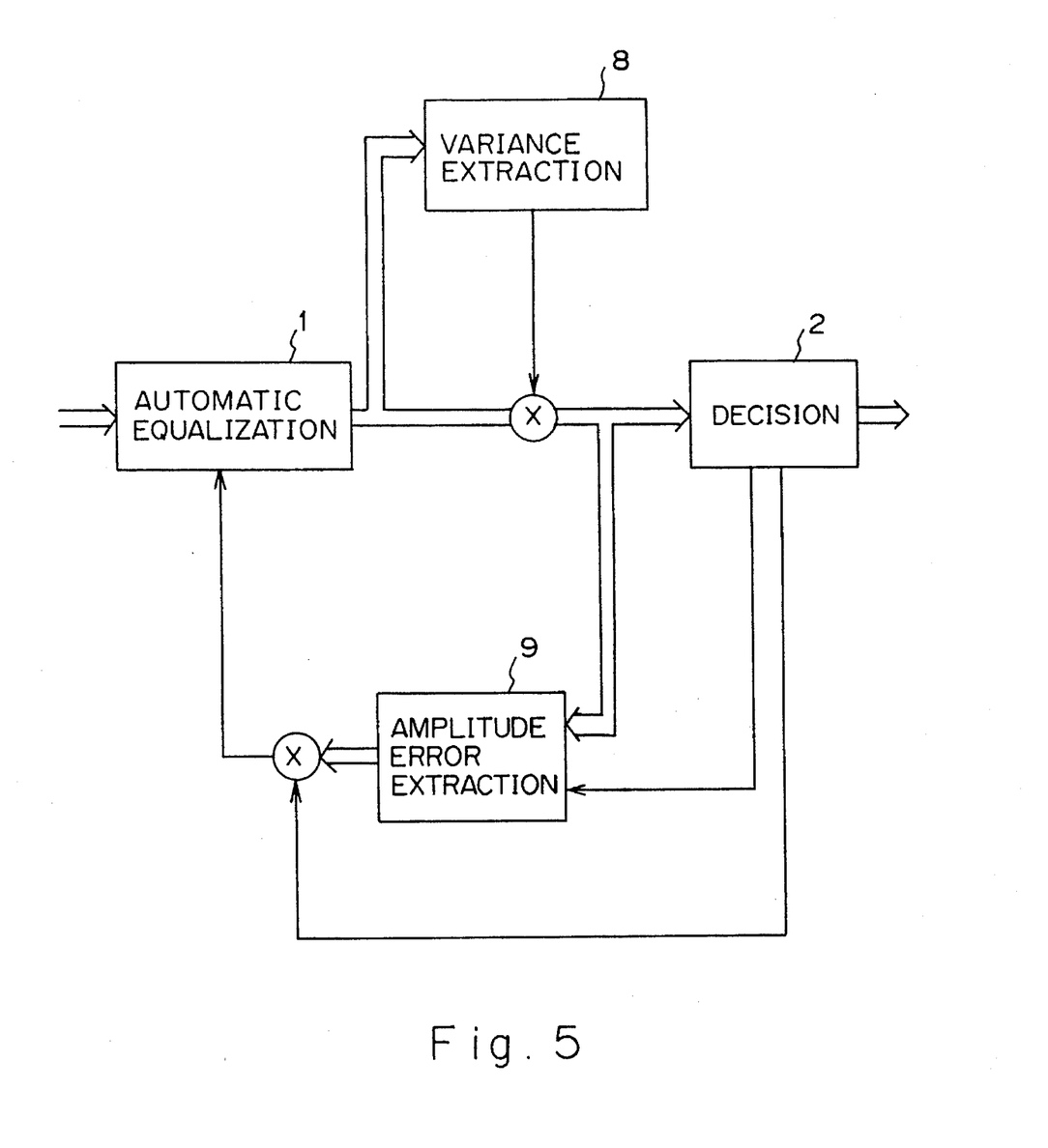
FIG. 5 is a diagram for use in explanation of the fundamental principle of the present invention.

FIG. 5 illustrates the basic arrangement of the present invention. According to a first aspect of the present invention, a variance extracting section 8 extracts the variance of an output signal of a transversal automatic equalizing section 1 and changes a predecision input signal to the optimum level according to the extracted variance.

According to a second aspect of the present invention, the amplitude error extracting section 9 extracts an amplitude error from a predecision input signal and a postdecision output signal and corrects tap coefficients of the transversal automatic equalizing section 1 according to the amplitude error extracted.

According to a third aspect of the present invention, the variance extracting section 8 extracts the variance of an output signal of the transversal automatic equalizing section 1 and changes a predecision input signal level to the optimum level according to the extracted variance, and the amplitude error extracting section 9 extracts an amplitude error from a predecision input signal at decision 8 and a postdecision output signal to correct the tap coefficients of the transversal automatic equalizing section 1.

With the conventional data mode convergence method in which the degree of divergence of the transversal automatic equalizing section 1 is extracted, since when the received signal level becomes small as a result of divergence, the automatic equalizing section 1 makes its output level large, its output value is greatly deviated from the optimum value, thus delaying the convergence. Therefore, it is necessary to multiply the reference signal of the AGC 105 by the control coefficient α.

In the first operation mode of the present invention, on the other hand, the variance of the output signal of the transversal automatic equalizing section 1 is extracted and the predecision input level is changed to the optimum level according to the extracted variance. Therefore, the eye of the eye pattern can be changed to the optimum value, the need of control coefficients α is eliminated, and the automatic equalizer is able to converge in a short time.

In the conventional method, the error data including both the amplitude and phase error is multiplied by the output data of the carrier automatic phase compensating unit (CAPC) 5. Thus, the incorrect phase error is multiplied by the output data, thereby causing the tap coefficients of the transversal automatic equalizer 1 to deviate from the optimum value. The tap coefficient is corrected to an optimum value and thus, the automatic equalizer can converge within the short time.

In contrast, in the present invention, an amplitude error is extracted from a predecision input and a postdecision output and the tap coefficients of the transversal automatic equalizing section 1 are corrected according to the extracted amplitude error. Therefore, the tap coefficients are corrected based on whether the amplitude error data obtained by decision section 2 is located outside a signal point in which the intra data interference is small or the amplitude error data obtained by the decision section 2 is inside a signal point in which the intra data interference is large.

Thus, there is little probability of correcting the tap coefficients according to wrong amplitude error data. This permits the automatic equalizer to converge in a shorter time.

In the fourth aspect of the present invention, in order to extract the variance of the output of the transversal automatic equalizing section 1, a signal-point decision is made after the output of the automatic equalizing section 1 is made constant by a first automatic gain control section. The result of the decision is corrected by a second automatic gain control section, and a reference value is obtained from the corrected value. The reference value is output to a third gain control section which changes the output of the automatic equalizing section 1 to a proper level according to the reference value.

In the fifth aspect of the present invention, the energy at a receiving point is calculated using secondary approximation, and an amplitude error is calculated from the difference in energy between points of reception. The use of the secondary approximation, which is simple in operation, for calculating energy at points of reception permits the amplitude error to be easily calculated.

Hereinafter, a specific arrangement of the automatic equalizer of the present invention will be described with reference to FIG. 6.

Figure 6:
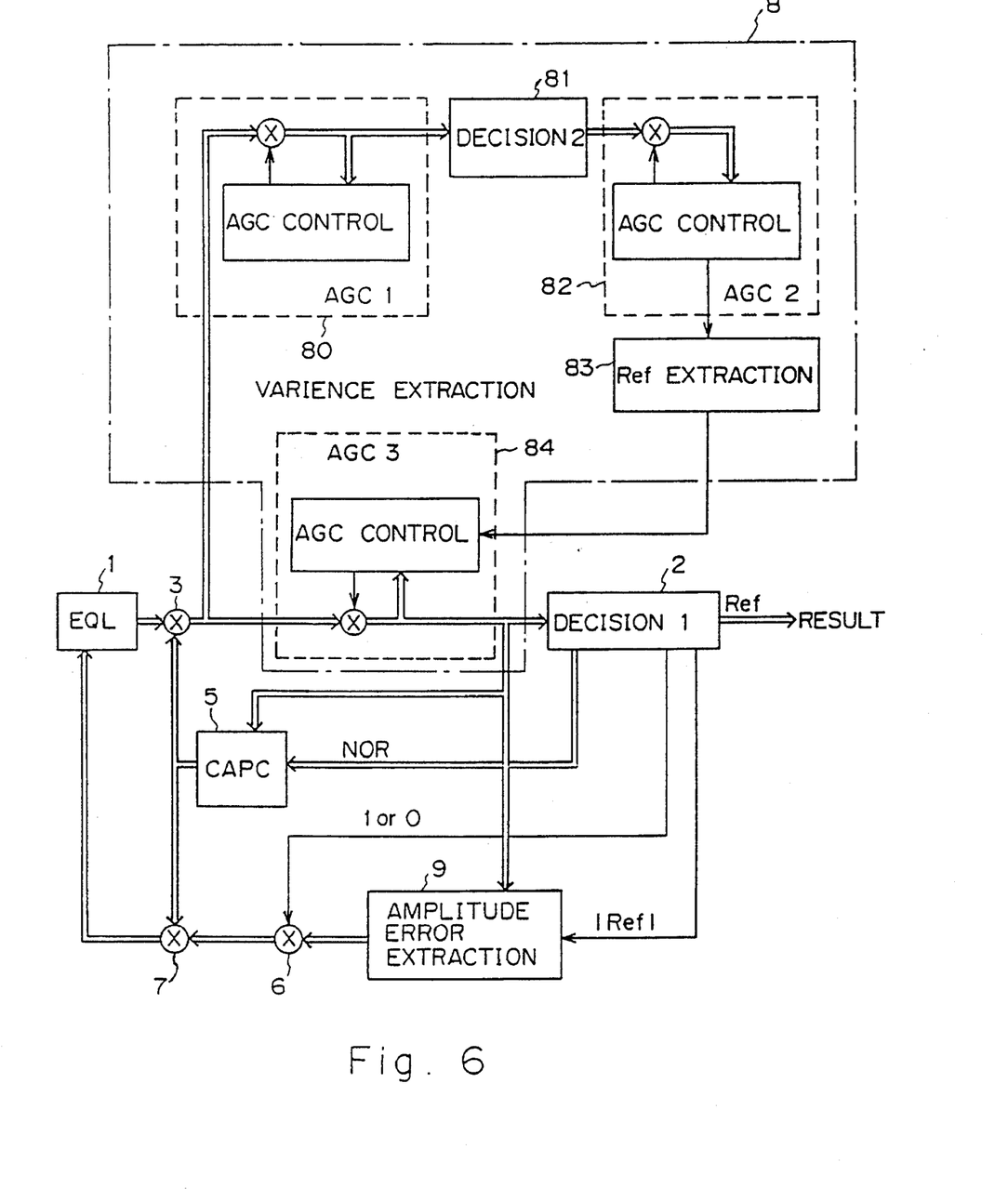
FIG. 6 is a block diagram of an automatic equalizer according to an embodiment of the present invention.

In FIG. 6, the same reference numerals are used to denote blocks which correspond to blocks in the conventional automatic equalizer shown in FIG. 3.

The variance extracting section 8 extracts the variance of the equalized output of the transversal automatic equalizing section 1. The amplitude error extracting section 9 extracts an amplitude error from the absolute value, |Ref|, of a vector at a signal point and the predecision input signal.

The variance extracting section 8 comprises a first automatic gain control section 80 for holding the amplitude of the equalized output of the automatic equalizing section 1 substantially constant, a decision section 81 for allocating the output signal of the first automatic gain controller 80 to a signal point, a second automatic gain control section 82 for holding the amplitude of the signal-point output of the decision section 81 substantially constant, a reference value extracting section 83 for extracting a reference value from the AGC controlled variable from the second automatic gain control section 82, and a third automatic gain control section 84 for holding the equalized output of the transversal automatic equalizing section 1 substantially constant according to the reference value extracted by the reference value extracting section 83.

The decision section 2 is equipped with a ROM storing a table which makes coordinate data of each of the signal points arranged on a two-dimensional plane correspond with the decision result for the signal point, the distance |Ref| between the signal point and the origin, and data (1 or 0) indicating whether the signal point exists in the inside area (called the dead zone), in which the amount of interference between data is large, or in the outside area, in which the amount of interference between data is small. When the real part and imaginary part of a receiving point are obtained, a reference is made to the coordinate data in the table to decide the signal point closest to the coordinate data of the receiving signal on the two dimensional plane, so that the decision result, the distance |Ref| and the 1/0 data for the signal point are output. The 1/0 data indicates whether the decided signal point exists in the outside area or the inside area.

The arrangement of the second automatic gain control section 82 will now be described, with reference to FIG. 7. This section comprises a squarer 820 which squares its input to calculate the input energy, an adder 821 which subtracts the output of the adder 820 from the input energy calculated from the reference value, a multiplier 822 which multiplies the output of the adder 821 by a coefficient $\alpha$, a tap section 823 for delaying the adder output, an adder 824 which adds the output of the multiplier 822 and the output of the tap section 823, a multiplier 825 for multiplying the adder output by a coefficient b, an adder 826 which adds a coefficient c to the output of the multiplier 825, and a multiplier 827 which multiplies the input to the automatic gain control section 82 by the output of the adder 826. The output signal of the adder 824 is output to the reference value extracting section 83 as an AGC control signal.

Figure 7:
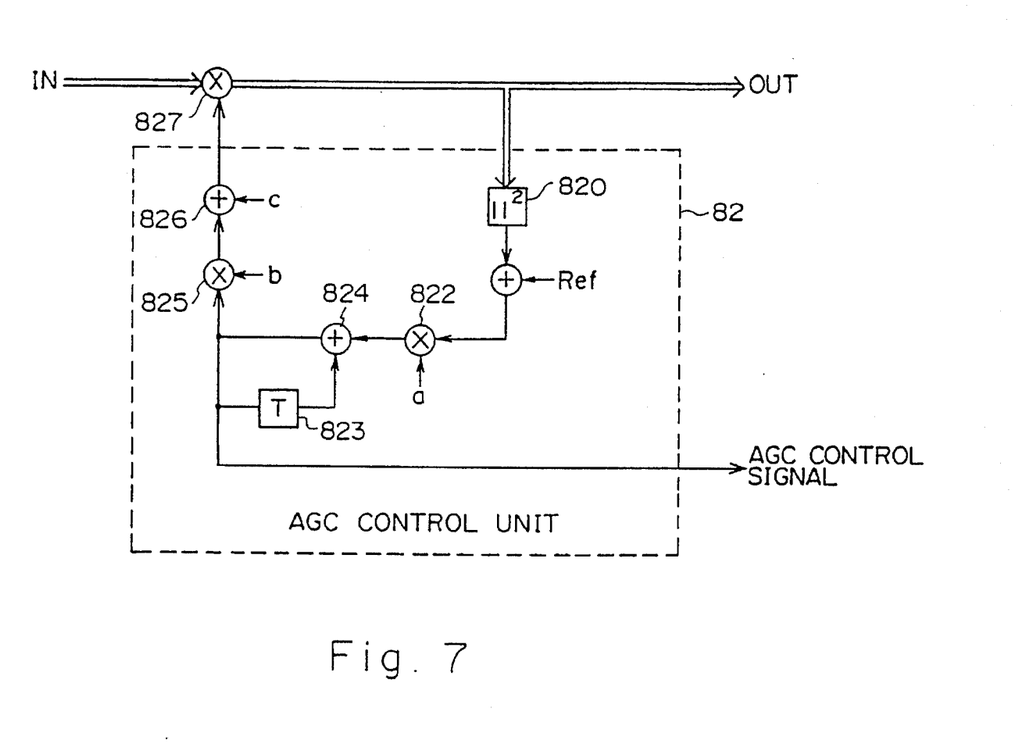
FIG. 7 illustrates an arrangement of the AGC control section of FIG. 6.

The first and third automatic gain control sections 80 and 84 are also configured as shown in FIG. 7.

Figure 8:
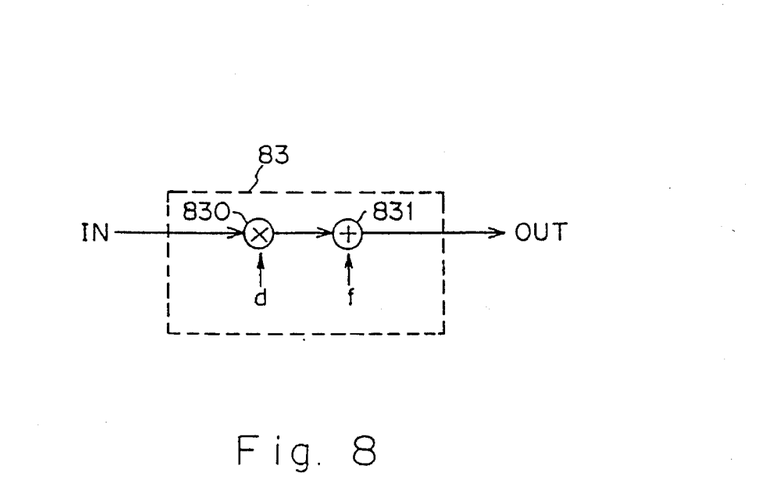
FIG. 8 illustrates an arrangement of the reference value extracting section of FIG. 6.

The reference value extracting section 83 is constructed, as shown in FIG. 8, from a polarity conversion section comprising a multiplier 830, which multiplies the AGC control signal output from the second automatic gain control section 82 by a coefficient d of negative polarity, and an adder 831, which adds a coefficient f to the output of the multiplier 830, thereby outputting the reference value to the third automatic gain control section 84.

Figure 9:
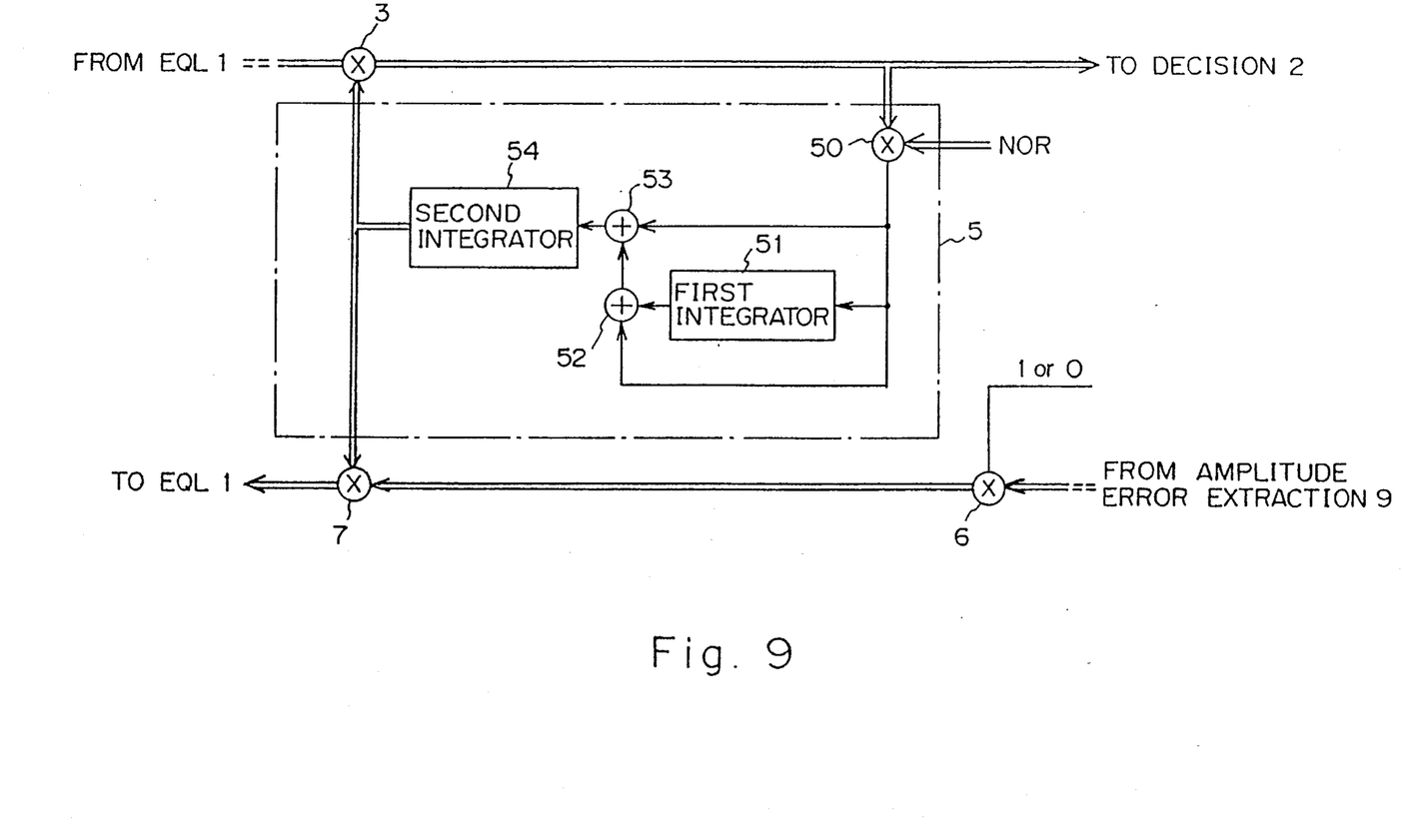
FIG. 9 illustrates an arrangement of the carrier automatic phase correcting section.

The carrier automatic phase correcting section 5 is constructed, as shown in FIG. 9, from a multiplier 50 for multiplying the predecision input and the decision result NOR from the decision section 2, a first integrator 51 for integrating the output of the multiplier 50 to calculate its average component, an adder 53 for adding the output of the multiplier 50 and the output of the first integrator 51, and a second integrator 54 for integrating the output of the adder 53.

The output of the second integrator 54 is multiplied by the equalized output of the automatic equalizing section 1 in the multiplier 3, thereby correcting the phase error component of the output signal from automatic equalizer. Also, in amplifier 7 the output of the second integrator 54 is multiplied by the product obtained by multiplying the amplitude error extracted from the amplitude error extracting unit 9 by 1/0 data representing whether the signal point is outside the dotted line shown in FIG. 2A or inside the dotted line shown in FIG. 2A. The tap coefficients of the automatic equalizer 1 can be corrected based on the output of the amplifier 7.

The operation of the automatic equalizer at the time of extraction of the variance is now described. When the output of the automatic equalizing section 1 is input to the first automatic gain control section 80 for level control, since the average level of the equalized output of the equalizing section 1 is low at divergence time, the output of the first automatic gain control section 80 is greater than the optimum level.

Figure 10A:
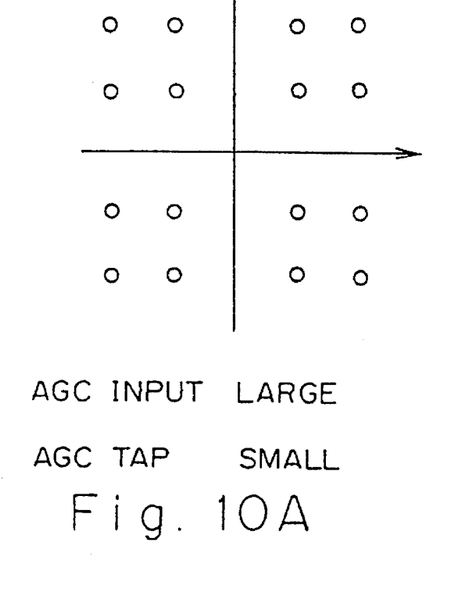
FIG. 10A is a first diagram for use in explanation of level adjust operation.
Figure 10B:
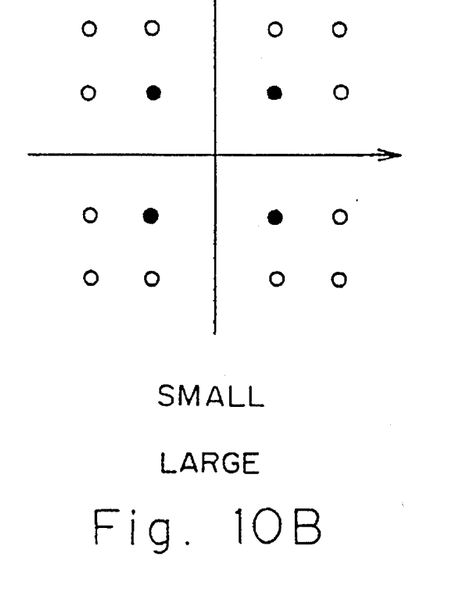
FIG. 10B is a second diagram for use in explanation of level adjust operation.

In this state, the decision section 81 performs decision operation and assigns the received signal whose level is corrected by the first automatic gain control unit 80 to correspond to a signal point on the two-dimensional plane. Then, upon divergence, the received signal is subjected to a normalized distribution with the origin point of the two dimensional plane at its center of the divergence. Thus, more received signals are assigned to the signal point which is closer to the origin point in the two dimensional plane as shown by a black circle in FIG. 2A. As a result, at divergence, the signal point at the center of the two dimensional plane is high in density and the distribution of the signal points is biased, thereby making the distribution smaller. In contrast at convergence, the received signal is distributed uniformly at respective signal points on the two dimensional plane, the received signal can be assigned to respective signal points as shown in FIGS. 10A and 10B. Thus, the divergence of the signal point becomes larger. At this time, the average density of the signal points at divergence is lower than the average density of the signal points at convergence.

As a result, the average level of the input signal to the second automatic gain controller 82 becomes large at convergence and becomes small at divergence. Therefore, the tap output of the automatic gain controller 82, namely, the AGC control signal becomes large at divergence and becomes small at convergence.

That is, the AGC control signal indicates the degree of the variance of output of the automatic equalizing section 1. When the variance is great (at convergence time), the AGC control signal is small, otherwise it is great (at divergence time).

In order to make the output of the automatic equalizing section 1 close to the optimum level, it is necessary to set the reference value of the third automatic gain control section 84 to be large at convergence time and small at divergence time.

To this end, the reference value extracting section 83 multiplies the AGC control signal output from the second automatic gain control section 84 by a negative coefficient d (for example, −¼) to convert the polarity and make the controlled variable small. This is output as the reference value for the third automatic gain control section 84.

Figure 10C:
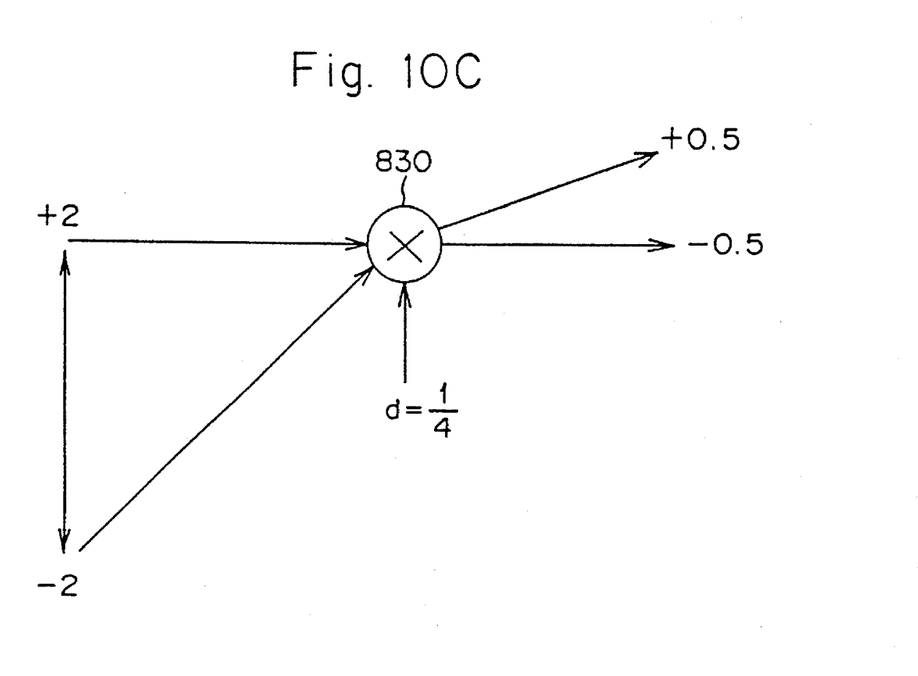

FIG. 10C is a diagram for use in explanation of the operation when the AGC control signal is multiplied by −¼ in the multiplier 830. When the AGC control signal is +2, the output of the multiplier 830 is −0.5. When the AGC control signal is −2, the multiplier output is +0.5.

As a result, the third automatic gain control section 84 corrects the output of the automatic equalizer 1 so the output levels do not become excessive during divergence and the output level does not become too small at convergence. As a result, the corrected output is output as the predecision input to the decision section 2.

By extracting divergence at the signal point obtained when the output of the automatic equalizer 1, i.e., the received signal subjected to the AGC control, is assigned to the corresponding signal point, and the reference value for the third automatic gain control section 84 is controlled to allow it to become large at convergence time and small at divergence time, the prior art problem of the output level of AGC controller becoming excessive at divergence and deviating greatly from an optimum value making convergence difficult is avoided. Thereby the automatic equalizer is enabled to allow convergence within a short time.

Figure 11A:
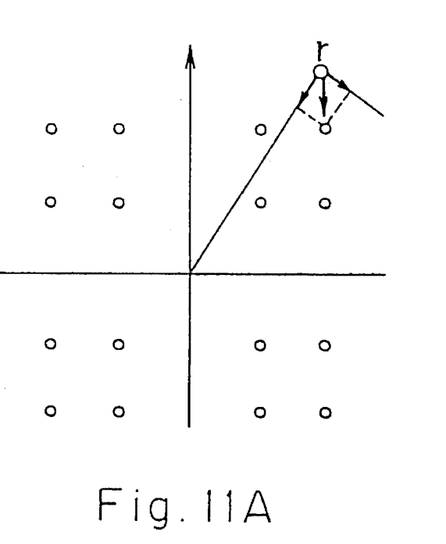
FIG. 11A is a first diagram for use in explanation of amplitude error.
Figure 11B:
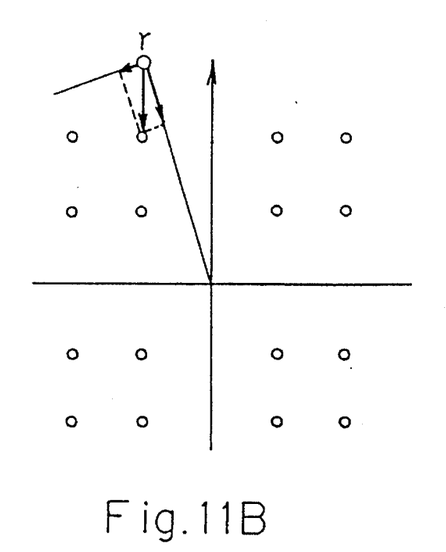
FIG. 11B is a second diagram for use in explanation of amplitude error.
Figure 11C:
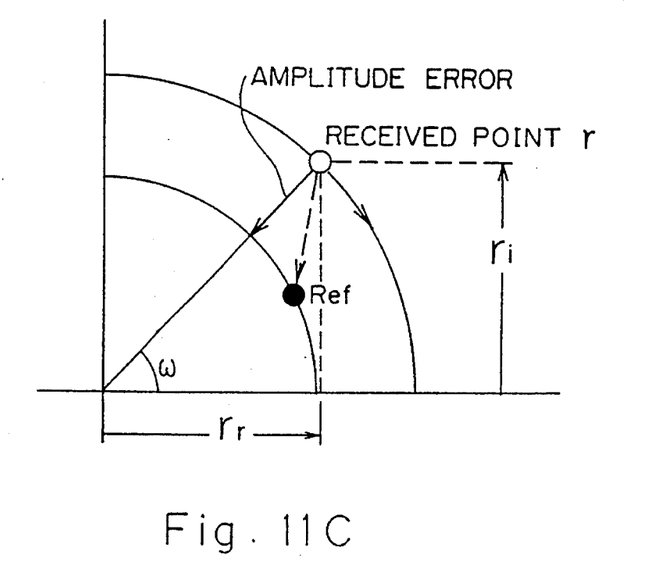
FIG. 11C is a third diagram for use in explanation of amplitude error.

Next, a method of obtaining amplitude errors will be described. As shown in FIGS. 11A to 11C, when each of vectors (error components at received points) directed from received points r to signal points (indicated by black dots) is split into a component (amplitude component) directed to the origin and a component (phase component) orthogonal to the amplitude component, the amplitude components are substantially the same at any point, but the phase components differ in direction.

If, therefore, only amplitude errors are extracted to pull in received data, data will be permitted to converge in a shorter time.

For example, suppose a vector is at a received point to be $|r|e^{jw}$ and a vector is at a signal point to be $|Ref|$, then the amplitude error will be represented by $$e^{jw}(|Ref|-|r|)=|r|e^{jw}(|Ref|/|r|-1) \qquad (1)$$

In equation (1), $|r|e^{jw}$ indicates a vector at a signal point as described above and $|Ref|$ indicates the absolute value of a vector at a signal point, which is obtained by the decision section 2. Thus, it is necessary only to obtain $1/|r|$.

$1/|r|$ can be calculated by equation (2) using a secondary approximation.

$$1/|r|=g(|r|^2)^2+h(|r|^2)^2+k \qquad (2)$$

Since $|r|^2$ can be expressed by equation (3), equation (2) can be rewritten as equation (4).

$$|r|^2=(r_r^2+r_i^2) \qquad (3)$$

$$1/|r|=g(r_r^2+r_i^2)+h(r_r^2+r_i^2)+k \qquad (4)$$

Figure 12:
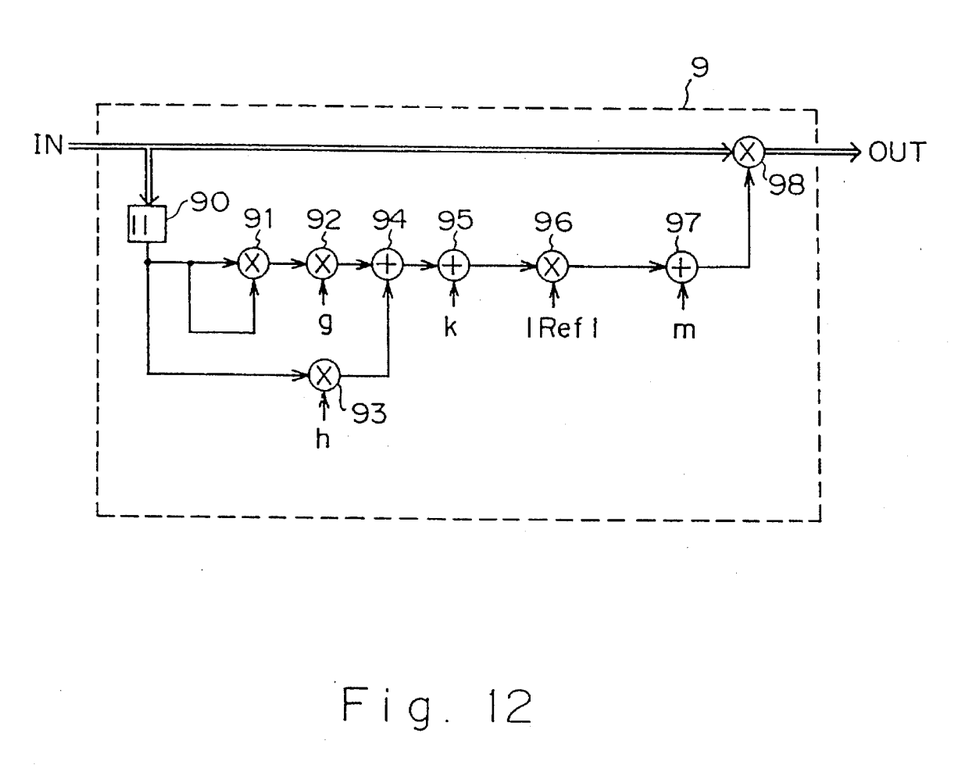
FIG. 12 illustrates an arrangement of the amplitude error extracting section of FIG. 6.

FIG. 12 shows an example of an arrangement of the amplitude error extracting section 9 which implements the above arithmetic operation.

The amplitude error extracting section 9 comprises a squarer 90 which squares a predecision output (received point) r to calculate energy, a squarer 91 which squares the output of the squaring section 90, a multiplier 92 which multiplies the output of the squarer 91 by a coefficient g, a multiplier 93 which multiplies the output of the squarer 90 by a coefficient h, an adder 94 which adds the outputs of the multipliers 92 and 93 together, an adder 95 which adds a coefficient k to the output of the adder 94, a multiplier 96 which multiplies the output of the adder 95 by the absolute value $|Ref|$ of the signal point vector, an adder 97 which adds a coefficient m to the output of the multiplier 96, and a multiplier 98 which multiplies the predecision output by the output of the adder 97.

A signal input to the amplitude error extracting section 9 is squared by the squarer 90 and then multiplied in the coefficient h by the multiplier 93. The output of the squarer 90 is squared by the succeeding squarer 91 and then multiplied by the coefficient g in the multiplier 92. The outputs of the multipliers 93 and 92 are added together by the adder 94. The coefficient k is added to the output of the adder 94 by the adder 95. Thereby, the operation of $$1/|r|=g(|r|^2)^2+h(|r|^2)^2+k$$

is performed.

Subsequently, the output of the adder 94 is multiplied by |Refl by the multiplier 96 and then m=−1 is added to the output of the multiplier 96. Thereby, the operation of (|Refl/|r|−1) is performed.

When the result of the above operation and the input signal $|r|e^{jw}$ is multiplied by the multiplier 98, the amplitude error represented by equation (1) is obtained.

The amplitude error output and an outside signal point decision output (1 or 0) from the decision section 2 are multiplied by the multiplier 6 (as shown in FIG. 6), and the output of the multiplier 6 is multiplied by the output of the carrier automatic phase correcting section 5 by the multiplier 7. The output of the multiplier 7 is applied to the automatic equalizing section 1 to correct its tap coefficients.

In this way, data convergence can be sped up by extracting the amplitude error of a received signal and correcting the tap coefficients of the automatic equalizing section 1 according to the amplitude error.

The present invention may be modified as follows.

(1) In addition to the above method of calculating the energy at receiving points as the method of extracting the amplitude error, the receiving point is normalized to the signal point with phase 0° and only the real component (the amplitude component) of the error is extracted. Thereafter, the real component of the error may be reversely rotated to the signal point corresponding to the receiving point. More specifically, it may be assigned to the signal point corresponding to the receiving point.

(2) Alternatively, after the amplitude component of the error is obtained by moving the receiving point along the circumference of a circle with radius 1, the amplitude component of the error is normalized by the magnitude of the signal point. Thereafter the signal point is subtracted from the receiving point, thereby obtaining the amplitude error.

Although the preferred embodiment of the present invention has been disclosed and described, it is apparent that other embodiments and modifications are possible.

According to the present invention, since the divergence of the signal point subject to the decision is extracted and the gain of the AGC is controlled based on the divergence, a proper AGC control is applied to the received signal. Consequently, the convergence of the automatic equalizer is sped up. By extracting only the amplitude error from the error data between the receiving point and the signal point, and by correcting the tap coefficients of the transversal automatic equalizer using the amplitude error, the tap coefficients can be controlled at the maximum value, resulting in the convergence of the automatic equalizer being sped up.

The data mode convergence method of the present invention does not use control coefficient α and does not require a determination of the control coefficient α for particular lines through experimentation. Further as the convergence of the automatic equalizer is sped up, the line cost can be reduced.

What is claimed is:

1. An automatic equalizer comprising:

a transversal automatic equalizing section for supplying an output signal, said transversal automatic equalizing section having a tap coefficient;

variance extracting means for extracting a degree of output signal distribution on two-dimensional coordinates of said transversal automatic equalizing section and for correcting said output signal of said transversal automatic equalizing section to a selected level according to said extracted output signal distribution and outputting the corrected output signal;

first decision means for receiving the corrected output signal and deciding a signal point corresponding to the corrected output signal received from said variance extracting means; and phase compensating means for amending the tap coefficient of said transversal automatic equalizing section, according to an error signal obtained based on a predecision input signal and a postdecision output signal from said first decision means.

2. The automatic equalizer according to claim 1, wherein said variance extracting means comprises:

first automatic gain control means for changing the output signal of said transversal automatic equalizing section to a constant level;

second decision means for deciding a second signal point of the output signal of said first automatic gain control means;

second automatic gain control means for outputting an automatic gain control signal dependent on the variance of said signal point decided by said second decision means;

reference value extracting means for extracting a reference value from said automatic gain control signal; and third automatic gain control means for changing said predecision input signal to a selected level based on said reference value.

3. An automatic equalizer comprising:

a transversal automatic equalizing section, having tap coefficients, for supplying an output signal;

variance extracting means for extracting a degree of output signal distribution on two-dimensional coordinates of said automatic equalizing section, correcting said output signal of said transversal automatic equalizing section, to a selected level according to the extracted output signal distribution, and for outputting said corrected output signal;

first decision means for receiving the corrected output signal and deciding a first signal point corresponding to said corrected output signal from said variance extracting means; and amplitude error extracting means for extracting an amplitude error from a predecision input signal and a postdecision output signal of said first decision means and correcting the tap coefficients of said transversal automatic equalizing section based on the extracted amplitude error.

4. The automatic equalizer according to claim 3, wherein said variance extracting means comprises:

first automatic gain control means for changing the output signal of said transversal automatic equalizing section to a constant level, second decision means for deciding a second signal point of the output signal of said first automatic gain control means;

second automatic gain control means for outputting an automatic gain control signal dependent on the variance of said second signal point decided by said second decision means;

reference value extracting means for extracting a reference value from said automatic gain control signal; and third automatic gain control means for changing said predecision input signal, output from said transversal automatic equalizing section, to a selected level based on said reference value.

5. The automatic equalizer according to claim 3, wherein said amplitude error extracting means calculates energy, at a receiving point, by secondary approximation, and extracts an amplitude error based on a difference in energy between the receiving point and a first signal point decided by said first decision means.

6. The automatic equalizer according to claim 3, wherein said amplitude error extracting means extracts the amplitude error by normalizing a receiving point based on the first signal point, decided by said first decision means, and rotates, in reverse, the amplitude error, the amplitude error comprising a real component extracted toward the first signal point.

7. The automatic equalizer according to claim 3, wherein:
the first signal point comprises a magnitude; and
said amplitude error extracting means extracts the amplitude error by moving a receiving point along a circumference of a circle with a radius of 1, normalizing the receiving point by the magnitude of the first signal point, and subtracting the first signal point from the receiving point.

8. The automatic equalizer according to claim 3, wherein:
said first decision means outputs, to said amplitude error extracting means, an interference signal indicative of whether there is a small amount of interference between data at the first decided signal point, and
said amplitude error extracting means corrects the tap coefficients of said automatic equalizing section, according to an extracted amplitude error extracted and when the interference signal output by said first decision means indicates a small amount of interference between data at said first decision signal point.

9. The automatic equalizer according to claim 5, wherein said amplitude error extracting means comprises:
a first squarer for squaring the predecision input signal and outputting a first squarer output signal;
a second squarer for squaring the first squarer output signal of said first squarer and outputting a second squarer output signal;
a first multiplier for multiplying the first squarer output signal of said first squarer by a first predetermined value and outputting a first multiplier output signal;
a second multiplier for multiplying the second squarer output signal of said second squarer by a second predetermined value and outputting a second multiplier output signal;
a first adder for adding the first multiplier output signal of said first multiplier and the second multiplier output signal of said second multiplier and outputting a first adder output signal;
a second adder for adding a third predetermined value to the first adder output signal and outputting a second adder output signal;
a third multiplier for multiplying the second adder output signal by an absolute value of the first signal point and outputting a third multiplier output signal;
a third adder for adding a fourth predetermined value to the third multiplier output signal and outputting a third adder output signal; and
a fourth multiplier for multiplying the predecision input signal by the third adder output signal.

10. The automatic equalizer according to claim 3, wherein:
said first decision means outputs, to said amplitude error extracting means, an interference signal indicative of whether an amount of interference between data is below a preselected value, and
said amplitude error extracting means corrects the tap coefficients of said automatic equalizing section, according to an amplitude error extracted and when the interference signal output by said first decision means indicates the amount of interference between data is below the preselected value.

11. A data mode convergence method which makes a decision for an output signal, comprising a variance, of a transversal automatic equalizing section using a decision means to obtain received data, obtain an error signal from a predecision input signal and a postdecision output signal and correct tap coefficients of said automatic equalizing section based on said error signal, comprising the steps of:
extracting a degree of output signal distribution on two-dimensional coordinates of said automatic equalizing section; and
changing said predecision input signal to a selected level according to the extracted output signal distribution.

12. The method according to claim 11, further comprising the steps of:
controlling the output signal of said transversal automatic equalizing section to a constant level and outputting the controlled output signal;
deciding a signal point of the controlled output signal, controlled to the constant level;
extracting an automatic gain control signal according to a variance of a signal point decided by said deciding step;
calculating a reference value from the automatic gain control signal; and
changing the output signal of said transversal equalizing section to a selected level based on the calculated reference value.

13. A data mode convergence method according to claim 11, further comprising the steps of:
extracting an amplitude error from said predecision input signal and said postdecision output signal;
deciding a signal point of the output signal;
determining whether there is a small amount of interference between data at the signal point; and
correcting the tap coefficients of said transversal automatic equalizing section, according to the extracted amplitude error, when there is a small amount of interference between data at a decided signal point.

14. A data mode convergence method according to claim 11, further comprising the steps of:
extracting an amplitude error from said predecision input signal and said postdecision output signal;
deciding a signal point of the output signal;
determining whether the amount of interference between data at the signal point is below a preselected value; and
correcting the tap coefficients of said transversal automatic equalizing section, according to the extracted amplitude error, when the amount of interference between data, at the decided signal point, is below the preselected value.

15. A data mode convergence method which makes a decision for an output signal of a transversal automatic equalizing section by a decision means to obtain received data, obtains an error signal from a predecision input signal and a postdecision output signal and corrects tap coefficients of said automatic equalizing section based on said error signal, comprising the steps of:

extracting an amplitude error from said predecision input signal and said postdecision output signal;

deciding a signal point of the output signal;

determining whether there is a small amount of interference between data at the signal point; and correcting the tap coefficients of said transversal automatic equalizing section, according to the extracted amplitude error, when there is a small amount of interference between data at a decided signal point.

16. A data mode convergence method which makes a decision for an output signal of a transversal automatic equalizing section by a decision means to obtain received data, obtains an error signal from a predecision input signal and a postdecision output signal and corrects tap coefficients of said automatic equalizing section based on said error signal, comprising the steps of:

extracting an amplitude error from said predecision input signal and said postdecision output signal;

deciding a signal point of the output signal;

determining whether an amount of interference between data at the signal point is below a preselected value; and correcting the tap coefficients of said transversal automatic equalizing section, according to the extracted amplitude error, when the amount of interference between the data at the signal point, is below the preselected value.

17. An automatic equalizer comprising:

an automatic equalizing section outputting an output signal;

variance extracting means for extracting a variance of the output signal of said automatic equalizing section, for correcting the output signal to a selected level according to the extracted variance, and for outputting a corrected output signal;

first decision means for deciding a signal point corresponding to the correct output signal received from said variance extracting means; and amplitude error extracting means for extracting an amplitude error from a predecision input signal and a postdecision output signal of said first decision means, for determining whether there is a small amount of interference between data at the signal point, and for controlling said automatic equalizing section according to the extracted amplitude error when there is a small amount of interference between the data at the signal point.

18. An automatic equalizer comprising:

an automatic equalizer section outputting an output signal;

variance extracting means for extracting a variance of the output signal of said automatic equalizing section, for correcting the output signal to a selected level according to the extracted variance, and for outputting the corrected output signal;

first decision means for deciding a signal point corresponding to the corrected output signal received from said variance extracting means; and amplitude error extracting means for extracting an amplitude error from a predecision output signal and a postdecision output signal of said first decision means, for determining whether there is a small amount of interference between data at the signal point, and for controlling said automatic equalizing section according to the extracted amplitude error when the amount of interference between the data at the signal point is below a preselected value.

* * * * *